US012285390B2

(12) United States Patent
Weigel et al.

(10) Patent No.: US 12,285,390 B2
(45) Date of Patent: Apr. 29, 2025

(54) METERING DEVICE FOR MICRO-TABLETS

(71) Applicant: Harro Hoefliger Verpackungsmaschinen GmbH, Allmersbach im Tal (DE)

(72) Inventors: Marco Weigel, Allmersbach im Tal (DE); Marlon Weigle, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 188 days.

(21) Appl. No.: 18/322,400

(22) Filed: May 23, 2023

(65) Prior Publication Data

US 2023/0372204 A1 Nov. 23, 2023

(30) Foreign Application Priority Data

May 23, 2022 (EP) .................................... 22174943

(51) Int. Cl.
*A61J 7/02* (2006.01)

(52) U.S. Cl.
CPC ...................................... *A61J 7/02* (2013.01)

(58) Field of Classification Search
CPC . A61J 3/074; A61J 7/02; B01F 35/882; B01F 2101/22
See application file for complete search history.

(56) References Cited

U.S. PATENT DOCUMENTS

| | | | | |
|---|---|---|---|---|
| 5,439,138 | A | 8/1995 | Deal | |
| 7,210,507 | B2 | 5/2007 | Facchini | |
| 2005/0121102 | A1* | 6/2005 | Nelson | A61J 3/074 141/67 |
| 2005/0217752 | A1* | 10/2005 | Facchini | A61J 3/074 141/144 |
| 2022/0227567 | A1* | 7/2022 | Hayakawa | A61J 7/0076 |

FOREIGN PATENT DOCUMENTS

| | | | |
|---|---|---|---|
| DE | 20 2016 000 442 | U1 | 2/2016 |
| EP | 0 890 513 | A1 | 1/1999 |
| GB | 1089747 | A | 11/1967 |

* cited by examiner

*Primary Examiner* — Jason K Niesz
(74) *Attorney, Agent, or Firm* — Walter Ottesen, P.A.

(57) ABSTRACT

A metering device is for the volumetric metering of micro-tablets or the like and for transferring metered partial amounts of the micro-tablets into target containers. The metering device includes a metering unit with volumetrically specific metering chambers and a feed container, which is disposed above the metering unit in the direction of gravity. The feed container has an upper filling opening, lateral container walls and a lower container bottom with transfer openings for transferring the micro-tablets into the metering chambers. At least one retaining bottom is disposed in the feed container between the filling opening and the container bottom. The retaining bottom covers the transfer openings in the container bottom, at least one through-gap for the micro-tablets being formed at the side of the retaining bottom.

9 Claims, 1 Drawing Sheet

METERING DEVICE FOR MICRO-TABLETS

CROSS-REFERENCE TO RELATED APPLICATIONS

This application claims priority of European patent application no. 22 174 943.5, filed May 23, 2022, the entire content of which is incorporated herein by reference.

BACKGROUND

In the case of metering in particular pharmaceutical preparations, products in the form of powders, granulates, pellets or the like are generally volumetrically admeasured and fed to a target container, for example in the form of a two-piece capsule, as an admeasured unit. The volumetric metering can be performed using roller metering apparatuses, slide metering apparatuses or the like, in which volumetrically specific metering chambers are formed. Above such metering units there is a feed container or intermediate container, in which a specific product reserve is provided. In the bottom of the feed container there are transfer openings, through which the product enters the metering chambers. The volume of such a metering chamber predefines the volume of the partial amount of the product that is to be admeasured, this partial amount then being transferred from the metering chamber to the target container.

In the case of the metering operation summarized above, use is made of the fact that the mentioned powders, granulates or pellets in the form of bulk material exhibit a certain fluidity, so that they virtually flow through the individual components of the metering device, similarly to a liquid.

By contrast to this, other products, such as micro-tablets, are usually admeasured not by volume but by the number of items. Metering drums or metering wheels provide a predetermined number of micro-tablets and then fill them into the two-piece capsule or into another target container. The metering, which is exact in terms of numbers, is mechanically very challenging. In the case of a multiple-track metering and filling operation, the mechanical complexity increases with the number of tracks and can be implemented only with great difficulty, for example, for 12-track operation. Volumetric metering, which in principle is much more straightforward, until now however could not be applied to micro-tablets, since the micro-tablets in the form of bulk material do not have the required fluidity like powders, granulates or pellets do.

SUMMARY

It is an object of the disclosure to further develop a volumetric metering device such that it is also suitable for metering micro-tablets.

This object is, for example, achieved by a metering device for the volumetric metering of micro-tablets and for transferring metered partial amounts of the micro-tablets into target containers. The metering device includes: a metering unit having a plurality of volumetrically specific metering chambers; a feed container disposed above the metering unit in a direction of gravity; the feed container defining an upper filling opening and having lateral container walls and a lower container bottom defining a plurality of transfer openings for transferring the micro-tablets into the metering chambers; at least one retaining bottom disposed in the feed container between the upper filling opening and the lower container bottom; the at least one retaining bottom covering the plurality of transfer openings in the lower container bottom; and, at least one through-gap for the micro-tablets being formed at a side of the at least one retaining bottom.

The disclosure is based first of all on the finding that micro-tablets, owing to the pressing operation used to produce them, have encircling edges which, in the case of use in bulk material form, promote mutual wedging-together which reduces the fluidity. By contrast to this, the individual particles of powders, granulates or pellets at least as a rough approximation have a spherical form, which promotes the fluidity. A further finding according to the disclosure is that the tendency to become wedged together cannot be overcome by increasing the flow pressure, but rather that, conversely, a high flow pressure promotes the formation of product bridges, which in turn interrupt the flow operation. On this basis, it is provided according to the disclosure that at least one retaining bottom is disposed in the feed container between the filling opening and the container bottom, the retaining bottom covering the transfer openings in the container bottom, and at least one through-gap for the micro-tablets being formed at the side of the retaining bottom. More such retaining bottoms between which through-gaps are formed may be provided. Preferably, a retaining bottom disposed centrally in the feed container is provided, two opposite edges of the retaining bottom being positioned at a distance from adjacent container walls to form a respective through-gap.

The designation used here, that what is involved is a metering device for the volumetric metering of micro-tablets or the like, does not mean that the metering device is intended exclusively for micro-tablets, but that it can also be used to this end, inter alia. It is thus possible to volumetrically meter and decant powders, granulates, pellets or specifically also micro-tablets in the form of bulk material using the same metering device, depending on requirements.

The effect of the retaining bottom according to the disclosure is that the product, which is replenished from above, first of all impacts the retaining bottom and from there passes through the through-gap onto the bottom of the feed container. The amount of product spreading out on the bottom of the feed container is, however, delimited by the retaining bottom. The result is a vertically limited level of product, which is upwardly shielded against material moving up by the retaining bottom. The vertically limited level of product reduces the pressure generated by the weight of the product, this reducing the tendency to becoming wedged together, in particular in the case of micro-tablets. As a result of the reduced pressure of the weight, the product, which is in particular (but not only) in the form of micro-tablets, is given increased fluidity, which enables disruption-free volumetric metering.

The retaining bottom can have any suitable shape and be, for example, a flat horizontal plate. Preferably, the retaining bottom is provided with at least one oblique surface which is inclined toward the through-gap. The oblique surface promotes the continuous flow of the product through the through-gap to the extent that amounts of product are removed below the retaining bottom by the ongoing metering operation. The precise maintenance of a desired and predetermined level of product is promoted. In a further embodiment, the retaining bottom is provided with a vertical surface adjacent to the through-gap. With its lower edge, the vertical surface predefines the height of the level of product on the container bottom in a similar way to the bird bath principle. Irrespective of this, the actual bottom surface can be positioned in terms of height and angle of inclination such that the continuous flow behavior and the level of product obtained can be set freely, without them influencing each other.

Advantageously, the metering device has a first vibrating drive, which acts at least on the retaining bottom and in particular on the structural unit of feed container and retaining bottom. Selecting a suitable mode of vibration and vibration intensity makes it possible to fluidize the product in such a way that it continuously flows onto the underside of the retaining bottom in the desired amount and that it spreads out on the container bottom with sufficient uniformity, in order to pass from there into the metering chambers through the transfer openings.

The metering unit can take any suitable form for a volumetric metering apparatus. Preferably, the metering unit is in the form of a slide metering apparatus with a metering slide and with a slide drive acting on the metering slide, the slide drive also being in the form of a vibrating drive for the metering slide. The slide drive thus performs a dual function. Firstly, it carries out the metering operation by moving the metering slide back and forth. Secondly, by way of a vibratory movement of the metering slide, it fluidizes the product that enters, and therefore it is ensured that the metering chambers are filled with the product completely and reproducibly in terms of the amount.

Analogously, the same also applies for a transfer element of the metering unit for transferring the metered partial amounts of the micro-tablets from the metering chambers to the target container: The metering unit advantageously includes a second vibrating drive, which acts on the transfer element and, by virtue of the fluidization of the product leaving the metering chambers, ensures that the product enters the target chamber without interruptions. It has proven to be expedient for this for the second vibrating drive to be formed by a pneumatic vibration generator mounted on the transfer element, the transfer element being suspended elastically resiliently in the direction of action of the pneumatic vibration generator. An effective vibration excitation which is easily adjustable in terms of its parameters is achieved with low mechanical outlay.

BRIEF DESCRIPTION OF DRAWINGS

The invention will now be described with reference to the drawings wherein.

DETAILED DESCRIPTION

Figure 1:
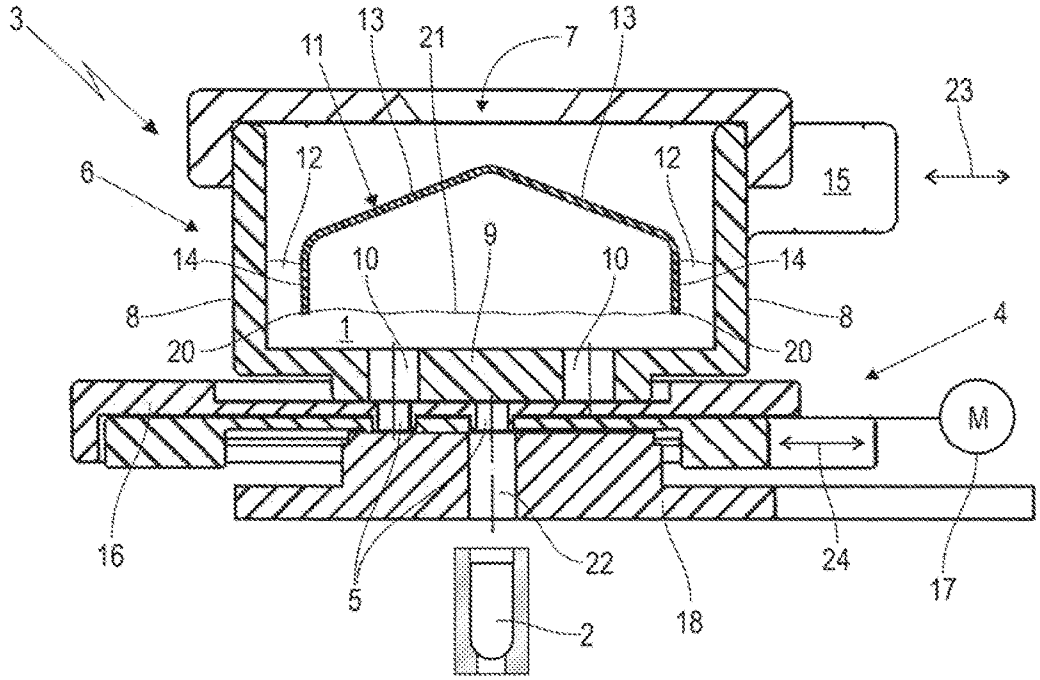
FIG. 1 shows a schematic cross-sectional illustration of a volumetric metering device which is configured according to the disclosure and has a feed container and a retaining bottom disposed in the feed container; and, FIG. 2 shows a schematic longitudinal sectional illustration of the transfer element according to FIG. 1 with details of a dedicated pneumatic vibration generator.

FIG. 1 shows a schematic cross-sectional illustration of a metering device 3, which is configured according to the disclosure, for the volumetric metering of bulk material in particular from the pharmacy or food supplement sector. Such bulk material is a powder, a granulate, pellets, micro-tablets 1 or the like. In the embodiment shown, the metering device is configured similarly for the metering of pellets and micro-tablets 1 which are less fluid than bulk material, here reference being made only to the micro-tablets 1 below for the sake of simplicity. In addition to the actual metering of the micro-tablets 1, that is, the volumetric admeasuring of partial amounts of them, the metering device 3 also transfers these metered partial amounts into target containers 2. Shown as target container 2 by way of example here is the open bottom part of a two-part capsule, which is in a capsule segment of a capsule filling machine. However, it may also be another target container, such as sachets, stick packs or the like.

The metering device 3 includes a metering unit 4 and a feed container 6, which is disposed above the metering unit 4 in the direction of gravity. The metering unit 4 is in the form of a slide metering apparatus with a metering slide 16 and with a transfer element 18 positioned directly below the latter. In the metering slide 16, pairs of metering chambers 5 with set volumes are formed. There is a respective transfer channel 22 in the transfer element 18 in the center underneath these metering chambers. The metering unit 4 also includes a slide drive 17, only indicated schematically, which acts on the metering slide 16 to generate a cyclical back-and-forth movement in a horizontal direction, corresponding to a double-headed arrow 24, relative to the transfer element 18 which is substantially stationary in space. A servo drive is used here as slide drive. The direction of the back-and-forth movement corresponds to the direction of the distance between the two metering chambers 5 that form a pair. The amplitude of the back-and-forth movement is the same as the stated distance, the movement being adapted in such a way that one of the two metering chambers 5 is alternatingly brought into line with the transfer channel 22 of the stationary transfer element 18.

The feed container 6 has a lower container bottom 9, which is encompassed by lateral container walls 8. The feed container 6 is closed upwardly by an optional cover, in which a filling opening 7 is made. However, it may also be expedient to dispense with the cover, it then being the case that the filling opening 7 is formed by the open upper side of the feed container 6. The material to be filled or the bulk material, that is, here the flow of micro-tablets 1, passes through the upper filling opening into the feed container 6 and comes to lie on its container bottom 9.

A respective pair of transfer openings 10 for each pair of metering chambers 5 is formed in the container bottom 9. The distance between a pair of transfer openings 10 is matched to the movement stroke of the metering slide 16 in such a way that a respective metering chamber 5 of the metering slide 16 in alternation comes into line with a respective transfer opening 10 in the container bottom 9. In the process, a partial amount of micro-tablets 1 leaves the feed container 6 through the transfer opening 10 and enters the respective metering chamber 5, filling it. The volume of the metering chamber 5 predefines the partial amount to be admeasured or metered of micro-tablets 1. As a result of a movement stroke of the metering slide 16 corresponding to the double-headed arrow 24, the metering chamber 5, which is completely filled with micro-tablets 1, then comes into line with the transfer channel 22 in the transfer element 18. The partial amount of micro-tablets 1 that is in the metering chamber 5 and thus volumetrically admeasured then falls downward out of the metering chamber 5 and passes through the transfer channel 22 into the target container 2. With the same movement stroke of the metering slide 16, the respective other metering chamber 5 is brought into line with the respective other transfer opening 10, with the result that this other metering chamber 5 is filled with micro-tablets 1 in the way described above, while the first metering chamber 5 is emptied through the transfer channel 22. As a consequence of a subsequent stroke movement in the opposite direction, the second metering chamber 5 is emptied through the transfer channel 22 into an associated target container 2, while the first metering chamber 5 is refilled. The cyclical back-and-forth movement of the metering slide 16 thus alternatingly fills a respective one of the two metering chambers 5 with micro-tablets 1, while the respective other metering chamber 5 of a pair thereof is emptied into the associated target container 2.

Summarized briefly, what is carried out is a volumetric metering of micro-tablets 1 or the like and a transfer of the metered partial amounts thereof into respectively assigned target containers 2.

Processes and functions of the device as described above presuppose that the bulk material to be decanted is sufficiently fluid, this not being readily the case for some bulk materials and in particular for micro-tablets. To support the desired fluidity, according to the disclosure at least one, here precisely one, retaining bottom 11 is disposed in the feed container 6 between the filling opening 7 and the container bottom 9. The retaining bottom 11 covers the transfer openings 10 in the container bottom 9 in the vertical direction or direction of gravity. There is at least one through-gap 12 for the micro-tablets 1 at the side of the retaining bottom 11. In the embodiment shown, the retaining bottom 11 is central with respect to the lateral direction, that is, disposed in the middle of the feed container 6, with the result that two opposite edges of the retaining bottom 11 are positioned at a distance from the respective adjacent container walls 8. As a result of these distances, there is a respective through-gap 12 on either side of the retaining bottom.

In the embodiment shown, the retaining bottom 11 is provided with at least one oblique surface 13, which is inclined toward the through-gap 12, and with a vertical surface 14 adjacent to the through-gap 12. Owing to the presence of two through-gaps 12, here the retaining bottom 11 has a mirror-symmetrical form with a total of two oblique surfaces 13 and a total of two vertical surfaces 14, a respective oblique surface 13 being inclined toward the respective through-gap 12 and a respective vertical surface 14 adjoining the respective through-gap 12. The vertical surfaces 14 adjoin outer lateral edges of the oblique surfaces 13 and terminate in lower edges 20 downwardly in the direction of gravity.

Bulk material in the form of micro-tablets 1 which is replenished from above through the filling opening 7 does not fall directly onto the container bottom 9, but first of all impacts on the retaining bottom 11. Assisted by the oblique surfaces 13, the micro-tablets 1 "flow" laterally toward the respective through-gap 12 and pass through it to arrive at the container bottom 9. On the container bottom 9, the micro-tablets 1 spread out to form a level of product 21. The height of the level of product 21 is predefined by the height or vertical position of the lower edges 20 when they are not loaded with micro-tablets 1 replenished from above. The height of the retaining bottom 11 or its lower edges 20 is set such that a less high and non-varying level of product 21 is set in comparison to the case without a retaining bottom 11. Consequently, within the product flow spread out on the container bottom 9, a weight pressure prevails which is kept constant, has a smaller magnitude, and permits the desired fluidity of the micro-tablets.

In addition to this, the metering device 3 includes a first vibrating drive 15, which acts at least on the retaining bottom 11. In the embodiment shown, the first vibrating drive 15 acts on the entire structural unit of feed container 6 and retaining bottom 11, and makes them vibrate corresponding to a double-headed arrow 23. Furthermore, the slide drive 17 is additionally also in the form of a vibrating drive for the metering slide 16 and makes the metering slide 16 vibrate when required. The vibration of the feed container 6, retaining bottom 11 and metering slide 16 is transferred to the amount of micro-tablets that is in contact with them and thus fluidizes or increases the fluidity while avoiding the micro-tablets becoming wedged together and forming bridges. In conjunction with the above-described action of the retaining bottom 11, the vibrating fluidization leads to the micro-tablets 1 present in the form of bulk material finding their way, owing to their weight force, through the through-gap 12, the transfer openings 10 and the metering chambers 5 into the respective target container 2.

Figure 2:
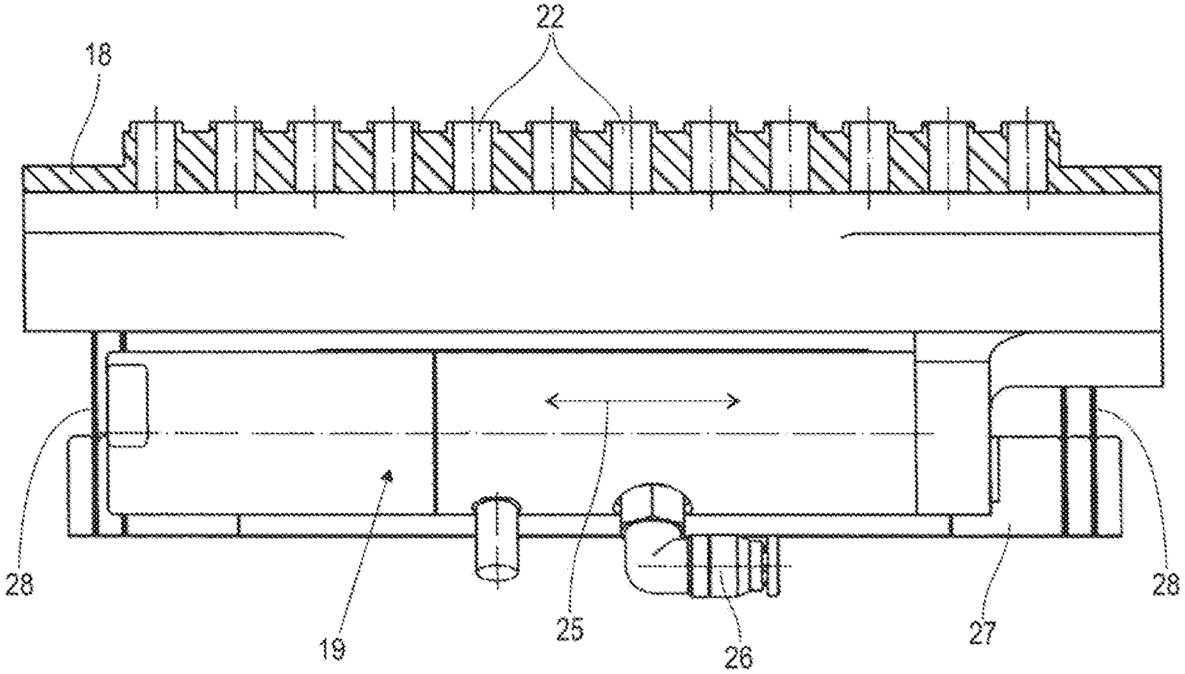

Analogously to this, the transfer element 18 is also provided with a dedicated, second vibrating drive 19, as can be seen in FIG. 2. FIG. 2 shows this transfer element 18 from FIG. 1 as an individual part in a lateral, partly sectional view that is rotated by 90° in relation to FIG. 1. Firstly, it can be seen that multiple, here by way of example twelve, transfer channels 22 disposed in a row are formed in the transfer element 18. Analogously to this, the metering slide 16 (FIG. 1) has a corresponding number of pairs of metering chambers 5 (not illustrated). A corresponding number of pairs of transfer openings 10 is also formed in the container bottom 9 of the feed container 6, like how the above-mentioned capsule segment has a corresponding number of receptacles for capsule bottom parts or target containers 2, with the result that multiple-track, here twelve-track, parallel operation is possible.

The transfer element 18 is fastened to a spatially fixedly secured base 27 via multiple, here via four, spring elements 28 in such a way that a lateral spring travel in the direction of a double-headed arrow 25 is possible, while the transfer element 18 is stationary in terms of all other spatial degrees of freedom. The second vibrating drive 19 is in the form of a pneumatic vibration generator and is fixedly connected to the transfer element 18. There is a vibrating mass, which is not illustrated, in the pneumatic vibration generator. Compressed air, which makes the vibrating mass move in lateral vibration corresponding to the double-headed arrow 25, is supplied via a pneumatic connection 26. The vibrating movement of the vibrating mass induces a vibrating movement of the transfer element 18 in its elastically resilient mounting in the direction of the double-headed arrow 25, the vibrating movement maintaining the fluidization of the micro-tablets 1 exiting the metering chambers 5 (FIG. 1) as they pass through the transfer channels 22.

Overall, continuous fluidization of the bulk material to be admeasured that is sufficient for the volumetric metering operation shown is thus also ensured when products that are difficult to handle, such as micro-tablets 1, are to be decanted as bulk material.

It is understood that the foregoing description is that of the preferred embodiments of the invention and that various changes and modifications may be made thereto without departing from the spirit and scope of the invention as defined in the appended claims.

The invention claimed is:

1. A metering device for the volumetric metering of micro-tablets and for transferring metered partial amounts of the micro-tablets into target containers, the metering device comprising:

a metering unit having a plurality of volumetrically specific metering chambers;

a feed container disposed above said metering unit in a direction of gravity;

said feed container defining an upper filling opening and having lateral container walls and a lower container bottom defining a plurality of transfer openings for transferring the micro-tablets into said metering chambers;

at least one retaining bottom disposed in said feed container between said upper filling opening and said lower container bottom;

said at least one retaining bottom covering said plurality of transfer openings in said lower container bottom; and, at least one through-gap for the micro-tablets being formed at a side of said at least one retaining bottom.

2. The metering device of claim 1, wherein said at least one retaining bottom is disposed centrally in the feed container; and, two opposite edges of said at least one retaining bottom are positioned at a distance from adjacent ones of said container walls to form a through-gap.

3. The metering device of claim 1, wherein said at least one retaining bottom has at least one inclined surface which is inclined toward said through-gap.

4. The metering device of claim 1, wherein said at least one retaining bottom is provided with a vertical surface adjacent to said through-gap.

5. The metering device of claim 1 further comprising a first vibrating drive configured to act at least on said at least one retaining bottom.

6. The metering device of claim 1 further comprising a first vibrating drive configured to act on a structural unit of said feed container and said at least one retaining bottom.

7. The metering device of claim 1, wherein the metering unit is a slide metering apparatus having a metering slide and a slide drive configured to act on said metering slide; and, said slide drive is a vibrating drive for said metering slide.

8. The metering device of claim 1 further comprising a transfer element for transferring metered partial amounts of micro-tablets from said metering chambers into the target containers; and a second vibrating drive configured to act on said transfer element.

9. The metering device of claim 8, wherein said second vibrating drive is formed by a pneumatic vibration generator mounted on said transfer element; and, said transfer element is suspended elastically resiliently in a direction of action of said pneumatic vibration generator.

* * * * *